United States Patent [19]

Hayashi

[11] Patent Number: 5,382,156

[45] Date of Patent: Jan. 17, 1995

[54] APPARATUS FOR EXTRACTING INJECTION-MOLDED PRODUCT

[75] Inventor: Yoichi Hayashi, Kanagawa, Japan

[73] Assignee: Fuji Photo Film Co., Ltd., Kanagawa, Japan

[21] Appl. No.: 127,378

[22] Filed: Sep. 28, 1993

[30] Foreign Application Priority Data

Oct. 12, 1992 [JP] Japan .............................. 4-076975[U]

[51] Int. Cl.6 ............................................ B29C 45/40
[52] U.S. Cl. ................................ 425/436 R; 264/334; 425/556
[58] Field of Search ........... 425/436 R, 436 RM, 444, 425/556; 264/334

[56] References Cited

U.S. PATENT DOCUMENTS

| | | | |
|---|---|---|---|
| 3,966,386 | 6/1976 | Beyer-Olsen et al. | 425/436 R |
| 4,028,039 | 6/1977 | de Putter | 425/436 R |
| 4,204,824 | 5/1980 | Paradis | 425/436 R |

FOREIGN PATENT DOCUMENTS

| | | | |
|---|---|---|---|
| 57-4310 | 6/1955 | Japan . | |
| 53-121857 | 10/1978 | Japan | 425/436 RM |
| 59-129517 | 8/1984 | Japan . | |

Primary Examiner—James P. Mackey
Attorney, Agent, or Firm—Sughrue, Mion, Zinn, Macpeak & Seas

[57] ABSTRACT

A molded product extraction apparatus in which a molded product formed using an injection molding process is extracted from a mold while being sandwiched. Surface portions for contacting the molded product are provided on the forward ends of a pair of opposite chuck arms disposed so as to be movable relative to each other to thereby hold the molded product, and elastic members of silicone foam rubber including continuous bubbles connected with each other are formed inside the surface portions. With the invention, it is possible to extract a molded product from a mold at a high speed without deforming the molded product.

6 Claims, 4 Drawing Sheets

APPARATUS FOR EXTRACTING INJECTION-MOLDED PRODUCT

BACKGROUND OF THE INVENTION

The present invention relates to an apparatus for extracting an injection-molded product from a mold, and particularly to an injection-molded product extracting apparatus for extracting from a mold an injection-molded openable/closable shutter used on a cartridge case for a disk-like recording medium.

Recently, disk-like recording media such as magnetic disks, optical disks, etc., have often been used in view of their simplicity of handling, high data storage capacity relative to volume, and the like. An example is a 3.5-inch micro-floppy diskette as shown in FIG. 4.

This micro-floppy disk 1 rotatably accommodates a magnetic disk 5 between upper and lower rectangular half-shells 2 and 3 formed of ABS resin or the like through injection molding. The magnetic disk 5 is a flexible magnetic recording medium in which a magnetic layer is formed uniformly on the surface of a disk-like macromolecular film base. A ring-like center plate 4 is fixedly attached to a circular opening formed at the center of the magnetic disk.

An opening 7 is formed at the center portion of the lower half-shell 3 of the diskette 1 so that a motor shaft can engage a substantially square opening 6 formed at the center portion of the center plate 4. Magnetic head insertion openings 8 are formed in the upper and lower half-shells 2 and 3 in the front portion of the micro-floppy diskette 1 so that a magnetic head can write information signals on and read such signals from the magnetic disk 5.

A sliding shutter 9 for opening/closing the magnetic head insertion openings 8 is provided on the micro-floppy diskette 1 in order to prevent dust or the like from entering through the magnetic head insertion openings 8 and adhering to the magnetic disk 5.

Conventionally, the shutter 9 has been formed by bending a metal plate such as a thin stainless steel plate or the like in a U-shape. The shutter includes a projection in the vicinity of the base portion of the shutter 9, which is guided within a guide groove provided along the outer front side edge of the lower half-shell 3 so that the shutter 9 is slidable in the direction to open/close the magnetic head insertion openings 8.

That is, the shutter 9 slides in a slide region 11 which includes the circumferential edges of the magnetic head insertion openings 8 and lies over one side of the micro-floppy disk 1. Opening portions 10 corresponding to the magnetic head insertion openings 8 are formed in the shutter 9 to expose the magnetic disk 5 while in use, while the magnetic head insertion openings 8 are closed by and the magnetic disk 5 is covered with the shutter 9 when the diskette is not in use.

Recently, there has been proposed a resin shutter, which can be produced easily and inexpensively by injection molding with synthetic resin, in place of a shutter formed of a metal plate material. Crystalline resin having a self-lubricating property such as polyacetal resin or the like, which has a sufficiently small sliding friction as to produce no resin dust while in use, is generally used to mold such a resin shutter. In the case of molding with crystalline resin, particularly in the case of molding a shutter by use of a thin mold portion into which resin is injected, it is necessary to ensure fluidity in the mold while injecting the resin by employing a high mold temperature (usually about 70° to 90° C.) to allow crystal growth to occur during the cooling time. As a result, the temperature of the molded product can reach 80° to 100° C. when it is extracted from the mold.

In order to extract such an injection-molded product and move it to the next stage of the manufacturing process, a chucking device, such as disclosed in Japanese Utility Model Unexamined Publications Nos. Sho-57-4310 and Sho-59-129517, has been used in which a pair of chuck members, which are opened/closed by a hydraulic cylinder, grasp a molded product from its opposite sides so as to sandwich the molded product between the chucking surfaces of the chuck members.

However, since a molded product in the form of a shutter not only has a high temperature coming out of the mold but also is very thin (in a range of 0.2 to 0.5 mm), if such a chucking device is used, the shutter can be easily deformed by the chucking force when the shutter is extracted from the mold.

Further, when an extremely thin shutter having a U-shaped section is sandwiched from its sides between the chucking surfaces as mentioned above, as shown in FIG. 5, often the molded product 9 is chucked in a slanted state such that only one outer surface portion of the molded product 9 contacts one chuck surface 51, the shutter is subjected to bending deformation, for example, in the connecting portion thereof, making it impossible to ensure accurate grasping and resulting in problems such as failure in carrying the shutter to the next stage.

Particularly because an elastic material 52 is generally provided on each chucking surface, right and left corner portions b of a back surface 9a of the molded product 9 are pressed into the chuck surfaces to form concave portions 53 in the elastic materials 52. Although these concave portions 53 actually contribute to holding the molded product 9 accurately, the portions immediately under the corner portions b are pushed inside the shutter by the chucking surfaces when the corner portions b are pressed into the chucking surfaces, so that there is a danger that the angles of the corner portions b can be changed to cause a serious defect in the shutter.

Further, as shown in FIG. 6, it may occur that the concave portions 53 do not immediately recover their original shapes after the molded product 9 is released from the chuck. Such a state results in problems such as deformation due to chucking so that grasping the molded product 9 cannot be performed accurately or the product is held in an inclined state.

To remedy the above problems, although it might be considered that the chucking force could be made small enough to avoid problems such as deformation due to chucking, the adjustment thereof has been very difficult since the accuracy of holding the shutter 9 is lowered if the chucking force is made small.

Another conventional apparatus for extracting a shutter from a mold operates by applying suction to the back surface of the shutter with a suction device to thereby improve the attitude of the extraction operation. However, in this apparatus, because the back surface (the plate surface connecting the front plate portion to the back plate portion) of the shutter is quite narrow (about 3.6 mm), the back surface must be very accurately positioned on the suction device in order to obtain a sufficient suction force. Therefore, in such a conventional apparatus, as shown in FIG. 7, an ejection pin 14 is provided to eject the shutter 9 from the mold a predetermined distance so as to make both sides of the shutter 9 contact a guide provided with an inclined guide surface 65, and only then reaching a suction device 63, to thereby guide the shutter 9 to the appropriate position.

However, the guide 64 for positioning the molded product can exert a relatively high force on the shutter 9. Also, the ejection pin 61 can be broken by the guide 64 in the case where the guide 64 is shifted a large amount due to the high temperature of the shutter 9 when the back surface portion of the shutter is inserted into the inclined guide surface 65.

SUMMARY OF THE INVENTION

Taking the foregoing problems into consideration, it is an object of the present invention to provide an apparatus for extracting a molded product from a mold accurately and rapidly without deforming the molded product.

The above and other objects of the present invention can be attained by an apparatus for extracting a molded product formed by injection molding from a mold while sandwiching the molded product, characterized in that a pair of chuck arms facing each other are provided so as to be movable relative to each other so as to be able to sandwich the molded product therebetween, the chuck arms having, at their respective forward ends, surface portions for contacting the molded product, the chuck arms having, on the insides of the respective surface portions, elastic members made of a silicone foam rubber including continuous bubbles connected with each other.

DESCRIPTION OF THE PREFERRED EMBODIMENTS

Figure 1:
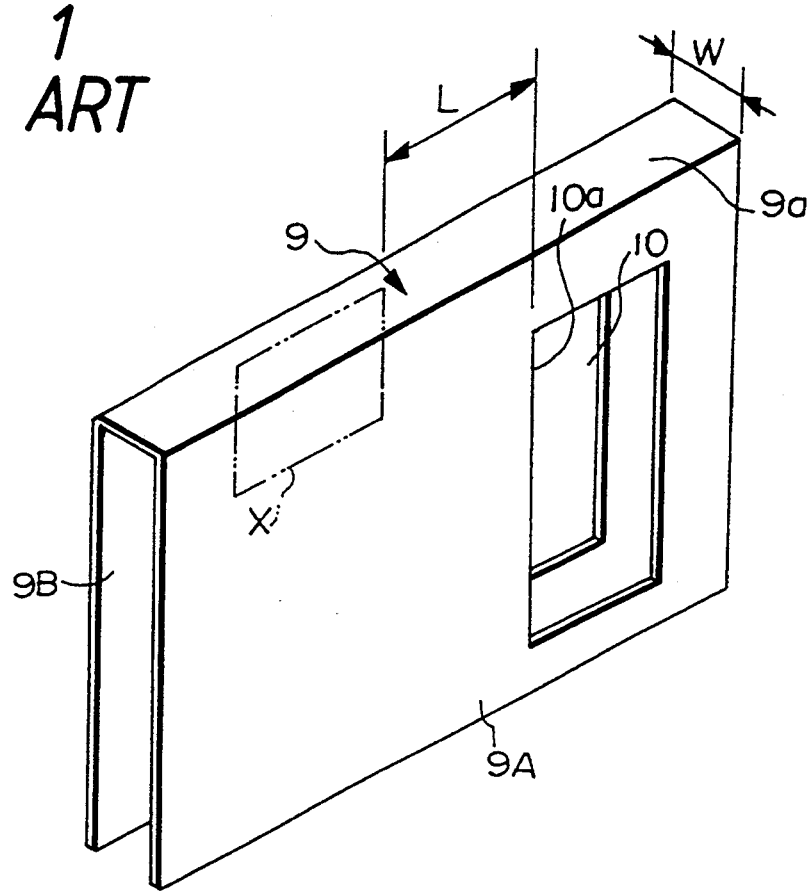
FIG. 1 is a perspective view illustrating the configuration of a molded shutter.

A preferred embodiment of the present invention will be described in detail with reference to the drawings. FIG. 1 is a perspective view for explaining the structure of a shutter 9 of a 3.5-inch micro-floppy diskette which is to be extracted from an injection mold using the apparatus according to the present invention.

The shutter 9, which is a molded product produced by injection molding with polyacetal resin and which has generally a U-shape, has front and back plate surfaces 9A and 9B connected to each other through a back surface 9a, a projection formed at an inner position (not shown) so as to be slidably engaged with a shell of a cartridge, and opening portions 10 for exposing a magnetic disk to the outside formed at positions corresponding to the magnetic head insertion openings 8.

Figure 2:
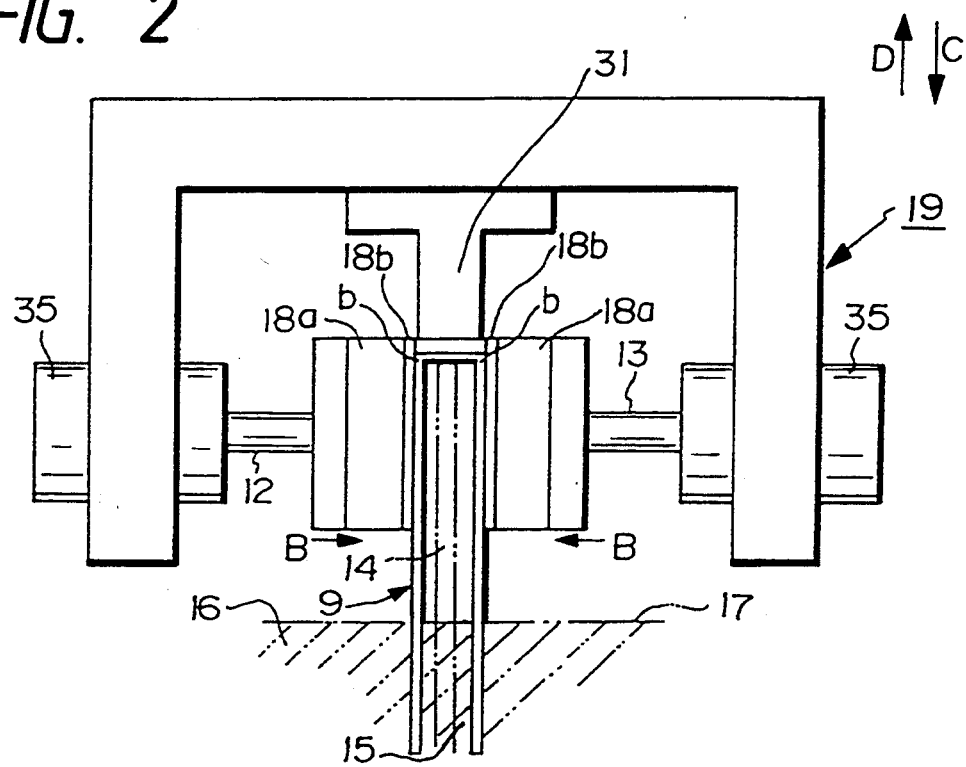
FIG. 2 is a sectional view showing a main portion of an apparatus of the invention for extracting a molded product.
Figure 3:
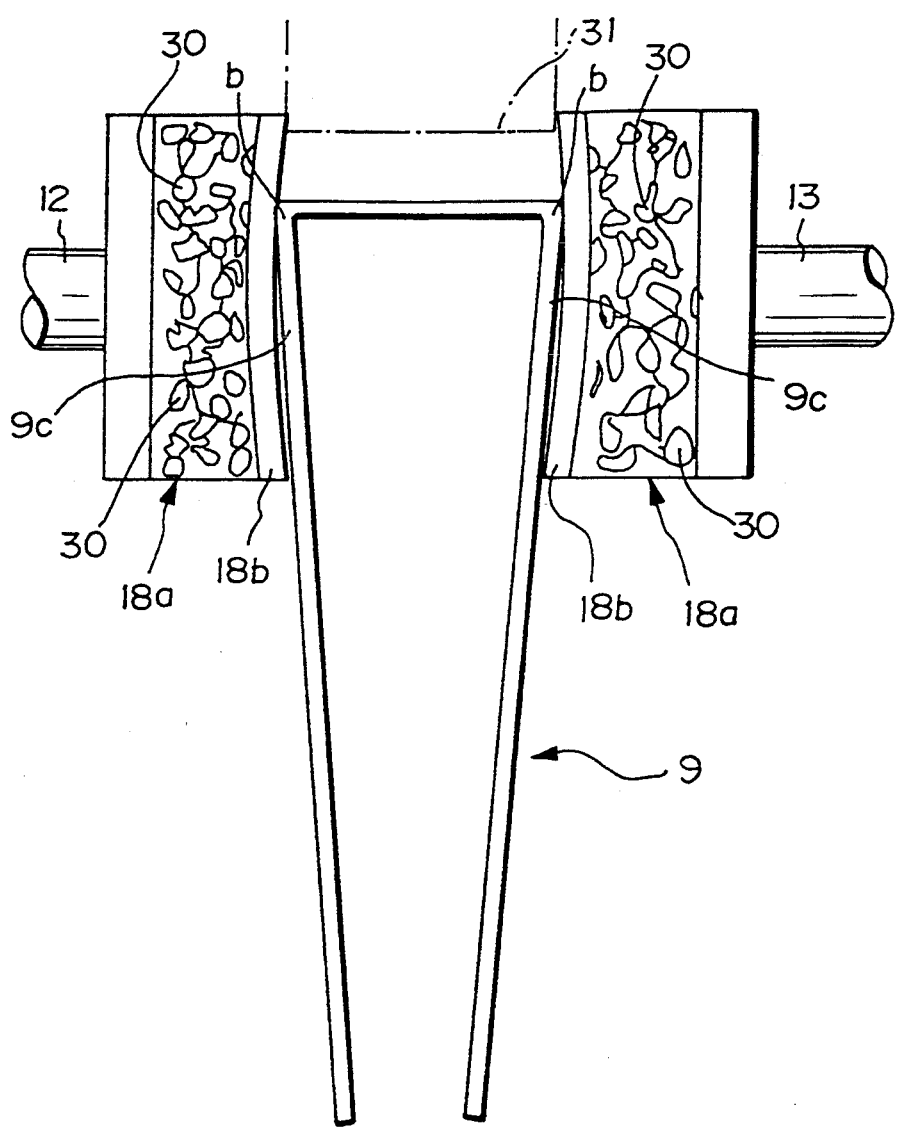
FIG. 3 is an expanded view illustrating a shutter and top portions of chuck arms.
Figure 4:
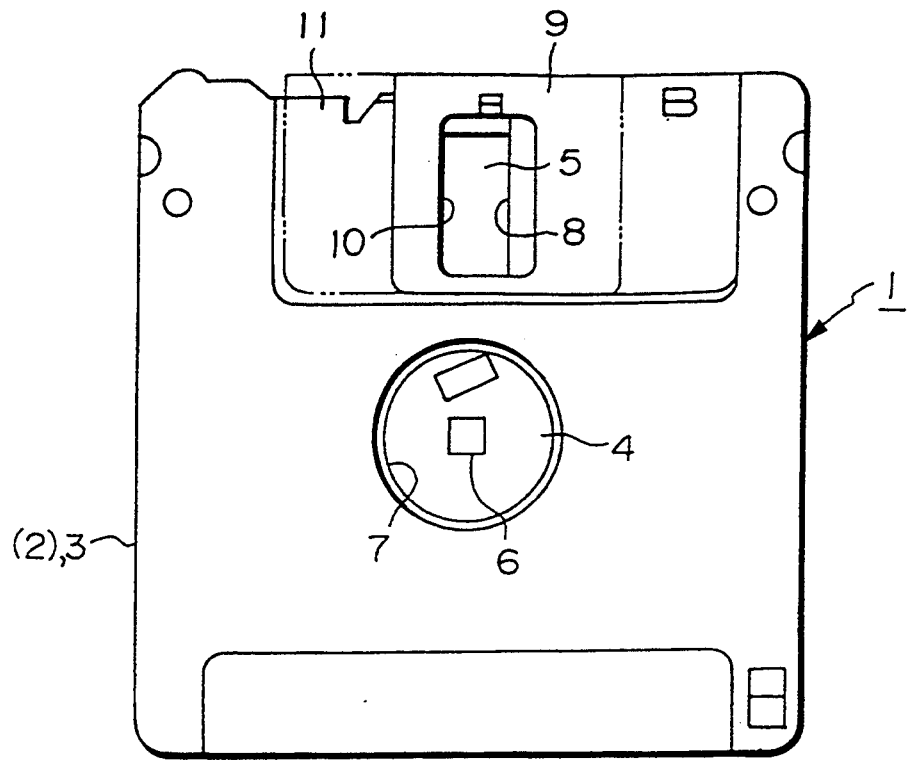
FIG. 4 shows the overall configuration of a 3.5-inch micro-floppy diskette to be provided with the shutter shown in FIG. 1.
Figure 5:
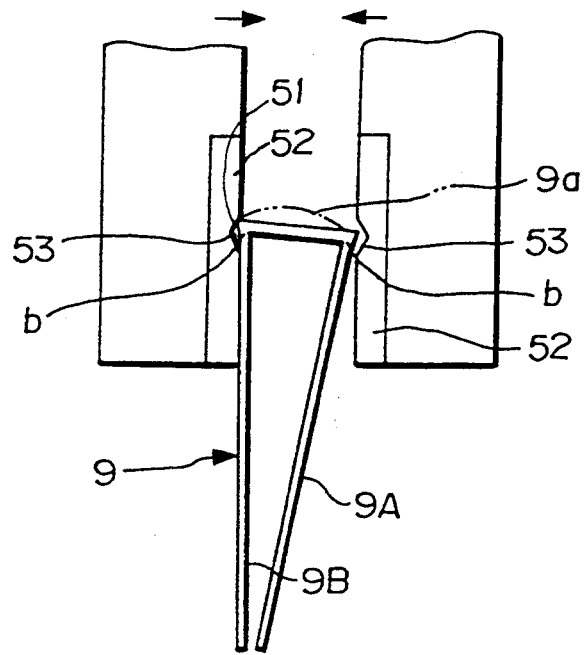
FIG. 5 is a schematic view illustrating the state of holding a molded product by back surface side chuck in a conventional apparatus for extracting a molded product.
Figure 6:
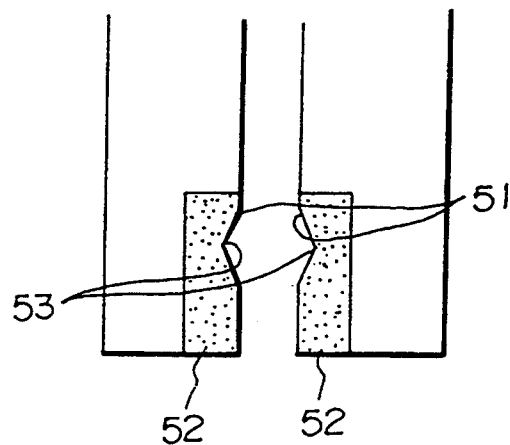
FIG. 6 is a schematic side view illustrating the state of deformation of conventional shutter holding portions.
Figure 7:
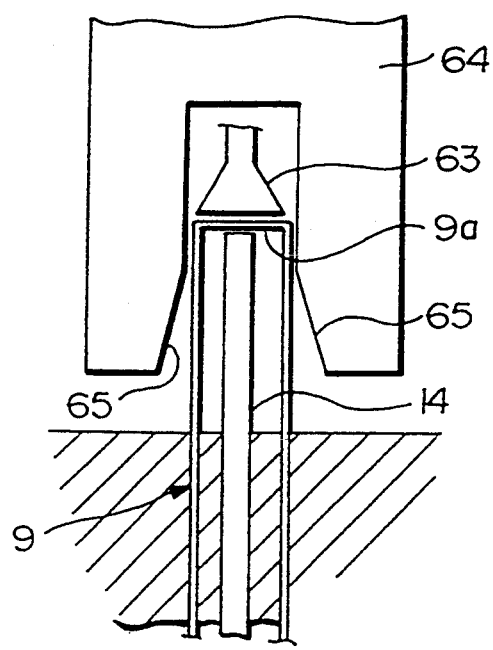
FIG. 7 is a schematic view illustrating the state of holding a molded product by back surface side chuck in another conventional apparatus.

The apparatus for extracting the shutter 9 according to the present invention will be described in detail with reference to FIGS. 2 and 3. FIG. 2 is a view showing the overall structure of a main portion of the inventive extraction apparatus and the operation thereof, and FIG. 3 is a schematic view of the main portion showing the state of holding the shutter In FIG. 2, an extraction apparatus 19 is provided on its lower sides with chuck arms 12 and 13 movable to the right and left. Elastic members 18a made of silicone foam rubber are disposed opposite each other on the forward ends of respective ones of the chuck arms 12 and 13. Surface portions 18b which come into contact with the shutter 9 are provided on the respective surfaces of the elastic members 18a. The surface portions 18b are made of a non-foamed material having a relatively high thermal conductivity.

The chuck arms 12 and 13, which are constituted by piston rods of air cylinders 35 and 35, chuck the shutter 9 when the air cylinders 35 and 35 are actuated.

The region X within which the shutter 9 is chucked is out of the opening portions 10 shown in FIG. 1. This is because the opening portions 10 of the shutter 9 are important for the enclosing function of the cartridge as well as for its opening/closing property, and the quality of the shutter for its these purposes can be reduced if the distance L from an opening edge 10a is set to not less than 5 mm. The portion to be chucked (the position where the chuck arms move and sandwich the shutter 9) is also important, and if too large deformation can result, while if too small the shutter can be dropped.

In the inventive apparatus, the portion to be chucked is established so that the distance between the above-mentioned surface portions 18b is in the region shifted from the width W of the shutter 9 by 0.2 to 1 mm. For example, with a stopper 31 facing the back surface of the shutter 9, accurate width and positioning of chucking can be obtained regardless of the shapes and sizes of the chuck arms 12 and 13 or the elastic members 18a, or the arm driving system. The stopper 31 is not limited to the illustrated structure, and may have such a structure wherein engagement members are provided to contact projections formed on the chuck arms 12 and 13.

In a mold, on the other hand, before the state shown in FIG. 2 is obtained, slide cores 16 and 17 disposed on the opposite sides of a center core 15 are slid in the right and left directions, leaving a space for formation of the shutter 9, and synthetic resin is injected from an injection nozzle (not shown) into a space defined by the center core 15, the slide cores 16 and 17, and another mold (not shown), namely, a mold provided with an injection nozzle, thereby to form the shutter 9.

After the mold halves are separated, the shutter 9 is pushed up by a projection pin 14 provided in the center core 15, as shown in FIG. 2. In this condition, the extraction apparatus 19 approaches the shutter 9 (in the direction of the arrow C), and then the chuck arms 12 and 13 are actuated to approach each other to sandwich the shutter 9 therebetween. Then, the extraction apparatus 19 is retracted (in the direction of the arrow D) to extract the shutter 9 from the mold. Subsequently, the extraction apparatus 9 performs a movement to bring the shutter 9 to the next stage of the manufacturing process.

The elastic members 18a, which perform an important role in the above-mentioned chucking operation, will be described in more detail.

Each elastic member 18a is required to be formed of an elastic material which is sufficiently soft so as not to deform the shutter, and is required to have a long life under high temperatures so as not to change in dimensions even after repeated chucking operations and carrying of a high-temperature molded product, a good thermal conductivity so as to prevent the shutter and the elastic member from being deformed due to heat working, an oil-proof property against anticorrosive oil coated on the mold at the beginning of molding, etc.

To satisfy these conditions, after extensive study of the elastic material 18a, the inventor has been determined that the material should not have only an elastic function bestowed by bubbles inside the material, but also should have a structure of continuous bubbles 30 which are connected with each other, as shown in FIG. 3, the continuous bubbles 30 occupying a substantially large portion of the volume of the material.

The continuous bubbles 30 can be formed, for example, by generating a large volume of bubbles when the elastic material 18a is formed. Thus the elastic material 18a can be produced as a substantially porous material.

The surface portions 18b are provided on the surface sides (the sides which come into contact with the shutter) of the respective elastic members 18a. The surface portions 18b should satisfy a number of requirements, for example, they should have no air bubbles, and have a good heat-proof property, elasticity, oil-proof property, and abrasion resistance. For example, a silicone-type rubber may be used as the material therefor. The surface portions 18b may be formed integrally with the elastic members 18a at the same time the elastic members 18a are formed so that the surface portions need not be separately prepared members adhered to the respective elastic members 18a.

As for the material for the surface portions 18b, a silicone-type foam rubber is preferable from the point of view of properties such as the heat-proof property, oil-proof property, etc. It is a matter of course that the degree of elasticity is extremely important for the elastic members 18a because if the elastic members 18 are too hard the shutter 9 will be deformed, otherwise if they are too soft the stability of chucking is lost. As a result of extensive tests for shutter deformation and chucking stability, it has been found that good results can be obtained when the hardness of the silicone foam rubber is within a range of 5 to 15 measured according to SRIS-0101 of the standards of the Chemical products Inspection Society.

Service life under high temperatures is an important factor. From this viewpoint, a general foam rubber such as natural rubber (NR), nitrile-butadiene rubber (NBR) or the like generally has a good heat-proof property up to 130° C., but deforms in a short time if used in an apparatus where it undergoes a large number of repetitions. According to tests conducted with nitrile-butadiene rubber, it was found that this material is not suitable in practical use since a concavity of the order of 0.5 mm was produced after 10,000 chucking operations. With silicone foam rubber having independent bubbles, the bubbles after receiving a chucking pressure under a high temperature repeatedly were broken since they were independent of each other. These bubbles could not recover their original states and were deformed permanently, deformations such as concavities were caused in the deformed portions, the elasticity, and therefore the function of holding a shutter during chucking, were reduced, and the service life reduced.

In this embodiment, on the other hand, silicone foam rubber having a heat-proof property at not less than 200° C. was used, wherein continuous bubbles 30 were present. With this material, since the continuous bubbles 30 were not independent, very little permanent deformation was seen, and a long service life could be attained even in the case of repeatedly applying chucking pressure under high temperature under the same conditions as those in the above-mentioned case of nitrile-butadiene rubber (comparative example).

That is, in the case of independent bubbles, the thermal conductivity, as determined by the convection of air in the independent bubbles, is so low that the adiabatic property is very high so as to significantly affect the progress of cooling the shutter 9, as a result of which the shutter 9 is apt to be deformed. Also, the deterioration of the portion contacting the shutter 9 is extremely accelerated to reduce the service life of the foam rubber. If continuous bubbles 30 are present, on the contrary, the thermal conductivity is improved by the movement (convection) of air in the continuous bubbles so that partial deterioration caused by interior heating can be avoided, and the heat of the shutter 9 can be dispersed easily and in such a manner as not to interfere with the hardening of the shutter 9.

Further, with the surface portions 18b made of non-foamed material provided on the surfaces of the elastic members 18a, the hardness of the surface portions 18 can be made harder than the elastic members 18a, so that the mechanical strength can be made higher, the thermal conductivity can be also made higher, and the functions lacking in the case of providing only the elastic members 18a can be obtained. That is, if the portions contacting the shutter 9 directly are made as hard as the elastic members 18a, troublesomely the portions 9c immediately under the corner portions b are deformed inside the shutter 9, but with the provision of the surface portions 18b having a desired hardness, the hardness of the surfaces can be made greater than that of the interior portions of the elastic members 18a, so that the elastic members 18a can be deformed gently so as to be prevented from excessive deformation, permitting a preferable contact state with a light touch to be attained. In addition, the mechanical strength of the portions which come into contact with the shutter can be improved by the provision of the surface portions 18b.

For example, in the repeating tests on the surface portions 18b made of silicone foam rubber, the same material as the elastic members 18a, while changing the thickness of the surface portions 18b, satisfactory results could be obtained within a range of thickness from 0.1 mm to 1.0 mm.

The present invention is not limited to the above embodiment, and can be modified in various points such as the driving system, the shape of the elastic members, etc.

As has been described above, in the apparatus for extracting a molded product according to the present invention, the bodies of the members facing each other of right and left chuck arms for sandwiching therebetween a molded product from its opposite sides immediately after molding are constituted by elastic members made of a silicone-type rubber. Accordingly, the chuck arms are very elastic when they sandwich the molded product therebetween, so that it is possible to avoid shock to the product, and it is possible to maintain a proper holding pressure. Further, because a great number of continuous bubbles in the elastic members communicate with each other, the molded product can release heat easily so that not only is it possible to eliminate deterioration of the elastic members, but also the molded product is allowed to harden in the normal manner. Further, with the surface portions formed of non-foamed material disposed on the respective elastic members, it is possible to prevent the molded product from excessively deforming the elastic members, as could occur if the elastic members were too soft, and it is possible to compensate the mechanical strength of the elastic members to make it possible to employ a very small holding force. Accordingly, it is possible to extract the molded product stably without producing any deformation in the molded product.

What is claimed is:

1. An apparatus for extracting an injection-molded product from a mold while sandwiching said molded product, comprising: a pair of chuck arms facing each other and movable relative to each other so as to sandwich a molded product therebetween; surface members for contacting said molded product formed on respective forward ends of said chuck arms; and elastic members made of silicon foam rubber including continuous bubbles connected with each other formed on said forward ends of said chuck arms disposed between said respective surface members and said chuck arms.

2. The apparatus for extracting an injection-molded product according to claim 1, in which the hardness of said elastic members is within a range of 5 to 15 (SRIS-0101 according to standards of the Chemical Products Inspection Society).

3. The apparatus for extracting an injection-molded product according to claim 1, in which the thickness of each of said surface members is within a range of 0.1 to 1.0 mm.

4. The apparatus for extracting an injection-molded product according to claim 1, wherein said surface members are made of a non-foamed material.

5. The apparatus for extracting an injection-molded product according to claim 1, wherein said surface members are made of non-foamed silicone rubber.

6. The apparatus for extracting an injection-molded product according to claim 5, wherein said surface members are formed integrally with said elastic members.

* * * * *